(12) United States Patent
Chiang

(10) Patent No.: US 7,944,672 B1
(45) Date of Patent: May 17, 2011

(54) CONTROL DEVICE FOR AN ACTUATOR

(75) Inventor: Wei-Yun Chiang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 12/710,583

(22) Filed: Feb. 23, 2010

(51) Int. Cl.
*H01H 47/00* (2006.01)
*H01H 9/00* (2006.01)
*H02H 51/22* (2006.01)
*H02H 3/00* (2006.01)
*H02H 3/20* (2006.01)
*H02H 3/24* (2006.01)

(52) U.S. Cl. ............ 361/190; 361/78; 361/86; 361/90; 361/160; 361/189

(58) Field of Classification Search .............. 361/160, 361/189–190
See application file for complete search history.

(56) References Cited

U.S. PATENT DOCUMENTS

2003/0030954 A1* 2/2003 Bax et al. ............... 361/87

* cited by examiner

*Primary Examiner* — Dharti H Patel
(74) *Attorney, Agent, or Firm* — Guice Patents PLLC

(57) ABSTRACT

A control device applicable to an actuator and including a voltage detection unit and a limit switch control unit. The control device is inbuilt inside the actuator without any additional control circuit for the control of the limit switches and the detection of the input voltage range. The limit switches are used to limit the travel of an actuating member of the actuator so as to avoid collision of the mechanism. The voltage detection unit serves to detect the input voltage range to control the operation of the actuator. Accordingly, the mechanism or the motor is protected from damage due to excessively low or high input voltage. The limit switches are freely adjustable in position and protected from high current. Therefore, the contacts of the limit switches are not liable to damage and the lifetime of the limit switches is prolonged. The control device further has electronic brake effect.

3 Claims, 7 Drawing Sheets

US 7,944,672 B1

CONTROL DEVICE FOR AN ACTUATOR

BACKGROUND OF THE INVENTION

The present invention relates generally to an actuator, and more particularly to a control device applicable to an actuator. The control device is an integration of a limit switch control circuit and an input voltage detection circuit and has electronic brake effect.

Most of the conventional limit switches applied to actuators pertain to hidden-type mechanical limit switches. FIG. 1 shows a conventional control device for an actuator 1. An actuating member 3 of the actuator 1 is driven by a motor 2 to move axially and reciprocally. Two mechanical limit switches 4, 5 are arranged in fixed positions to restrict the travel of the actuating member 3 within a range between two dead ends. In such conventional control device, the limit switches 4, 5 are hidden in the actuator so that it is impossible to adjust the positions of the limit switches 4, 5 in accordance with actual requirements. Moreover, the current that drives the motor 2 will directly flow through the limit switches 4, 5. As a result, a high current may flow through the contacts of the limit switches 4, 5 to cause damage of the contacts. Also, after a long period of use, the contacts are liable to damage. Moreover, the limit switches 4, 5 are very likely to be directly collided by external objects and damaged.

FIG. 2 shows another conventional control device for an actuator 1'. The positions of the limit switches 4' and 5' of the control device are freely adjustable. However, in such control device, the circuit of the motor 2' must be connected to the limit switches 4' and 5' by external connection wires. Therefore, as a whole, the layout of the external wires of the actuator 1' is complicated. This will affect the appearance of the actuator 1' and cause a security concern with the use of the actuator 1'. Furthermore, the limit switches 4' and 5' need to control the operation of the motor 2' through additional control circuit 6'. This leads to increase of cost.

FIG. 3 shows still another conventional control device for an actuator 1". In this control device, neither the motor nor the limit switch control circuit 7" of the actuator 1" has voltage detection function itself and an external control circuit 8" is needed for detecting the voltage. Such technique has poor reliability in voltage detection and control. As a result, the actuator 1" tends to operate too fast due to excessively high voltage. After a long period of use, the actuating member 3" may rush out from a predetermined travel and get damaged. On the other hand, the actuator 1" also may operate too slowly due to insufficient voltage. In this case, after a long period of use, the motor 2" may overheat to cause damage of components.

SUMMARY OF THE INVENTION

It is therefore a primary object of the present invention to provide a control device applicable to an actuator. The control device is an integration of a limit switch control unit and a voltage detection unit. The control device is inbuilt inside the actuator without any additional control circuit so that the appearance of the actuator is tidied and the reliability in the control of the actuator is promoted.

To achieve the above and other objects, the control device of the present invention includes a voltage detection unit and a limit switch control unit as an integration of a limit switch control circuit and an input voltage detection circuit. The control device is inbuilt inside the actuator without any additional control circuit for the control of the limit switches and the detection of the input voltage range. The limit switches of the control device are used to limit the travel of an actuating member of the actuator so as to avoid collision of the mechanism. The voltage detection unit serves to detect the input voltage range to control the operation of the actuator. Accordingly, the mechanism is protected from damage due to excessively low or excessively high input voltage. The limit switches are freely adjustable in position and protected from high current. Therefore, the contacts of the limit switches are not liable to damage and the lifetime of the limit switches is prolonged. Moreover, with the control device, the number of external connection wires of the actuator is reduced to minimize the difficulty in wire keeping. Also, it is unnecessary to connect the control device to any external control circuit so that the number of the components is reduced and the cost is lowered. In addition, the control device of the present invention has electronic brake function.

The present invention can be best understood through the following description and accompanying drawings, wherein:

DETAILED DESCRIPTION OF THE PREFERRED EMBODIMENTS

Figure 1:
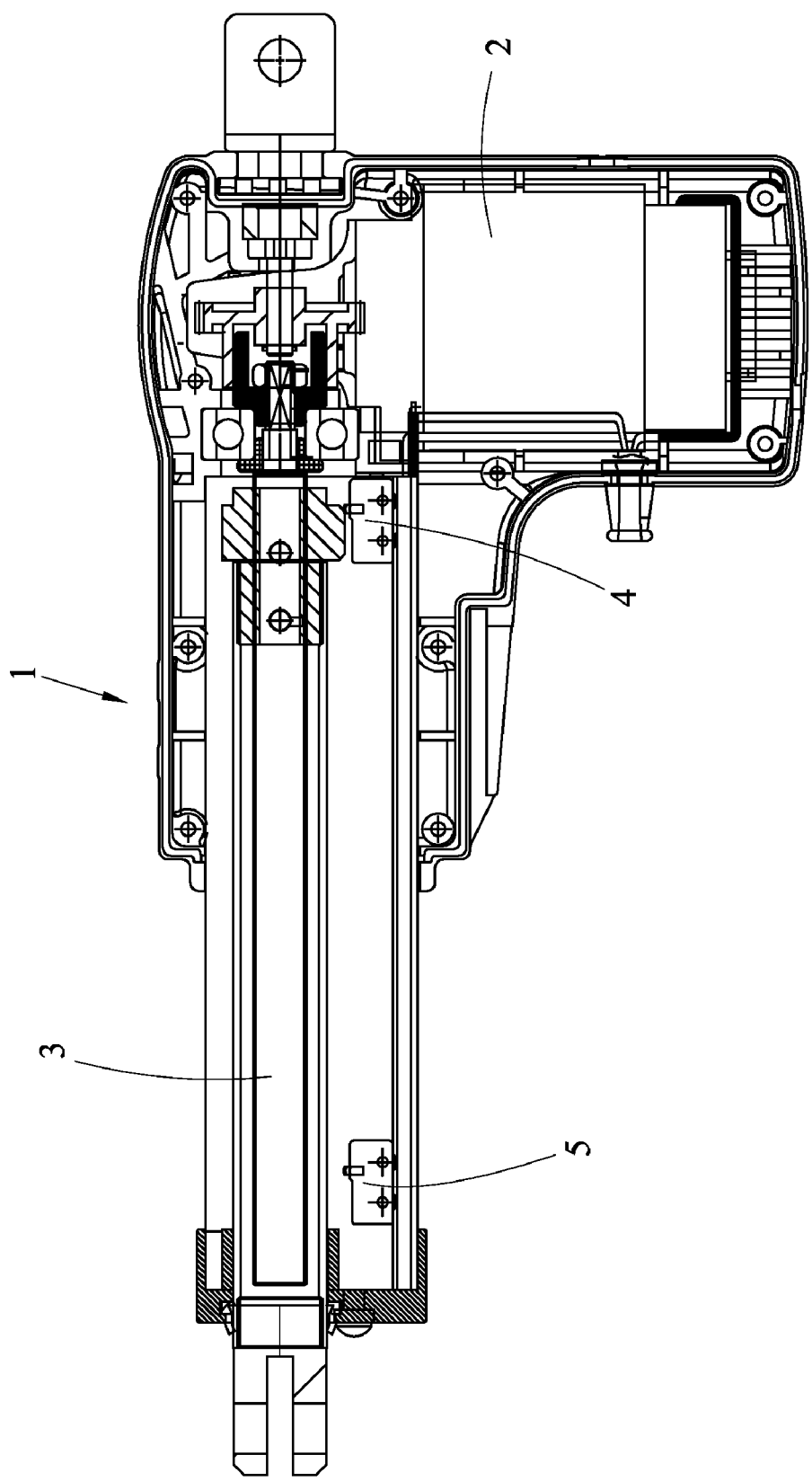
FIG. 1 is a sectional view of a conventional control device for an actuator, showing the wire layout thereof.
Figure 2:
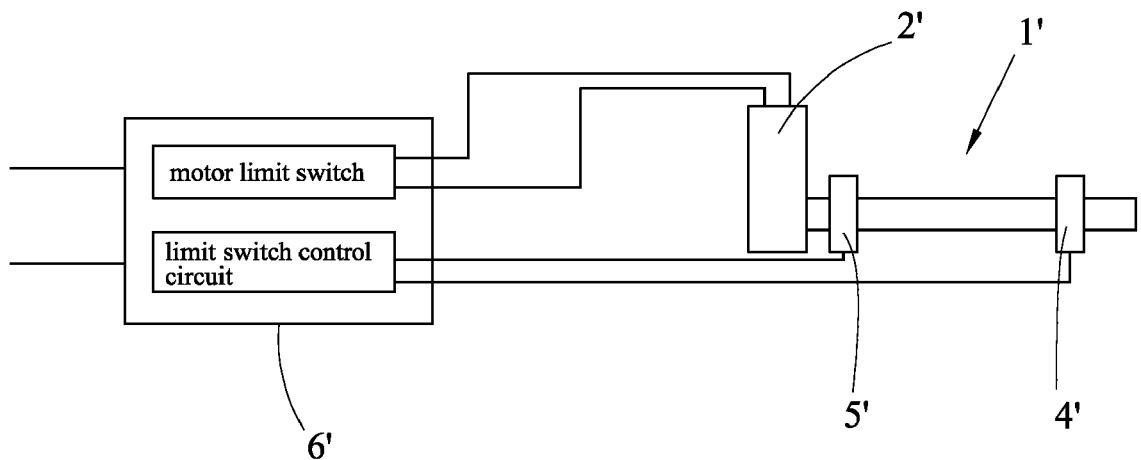
FIG. 2 is a block circuit diagram of another conventional control device for an actuator.
Figure 3:
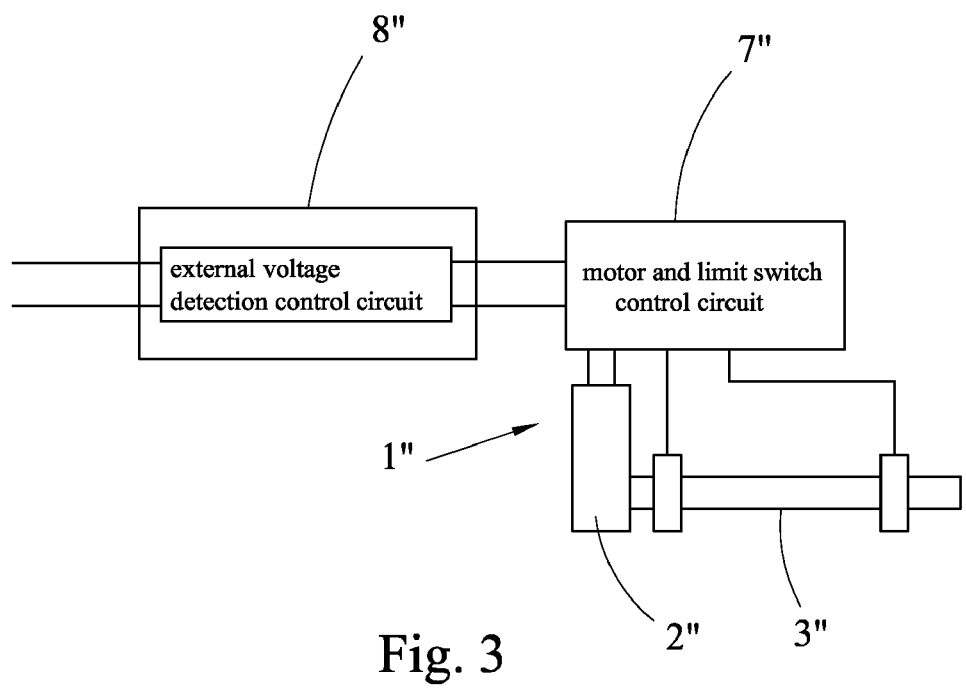
FIG. 3 is a block circuit diagram of still another conventional control device for an actuator.
Figure 4:
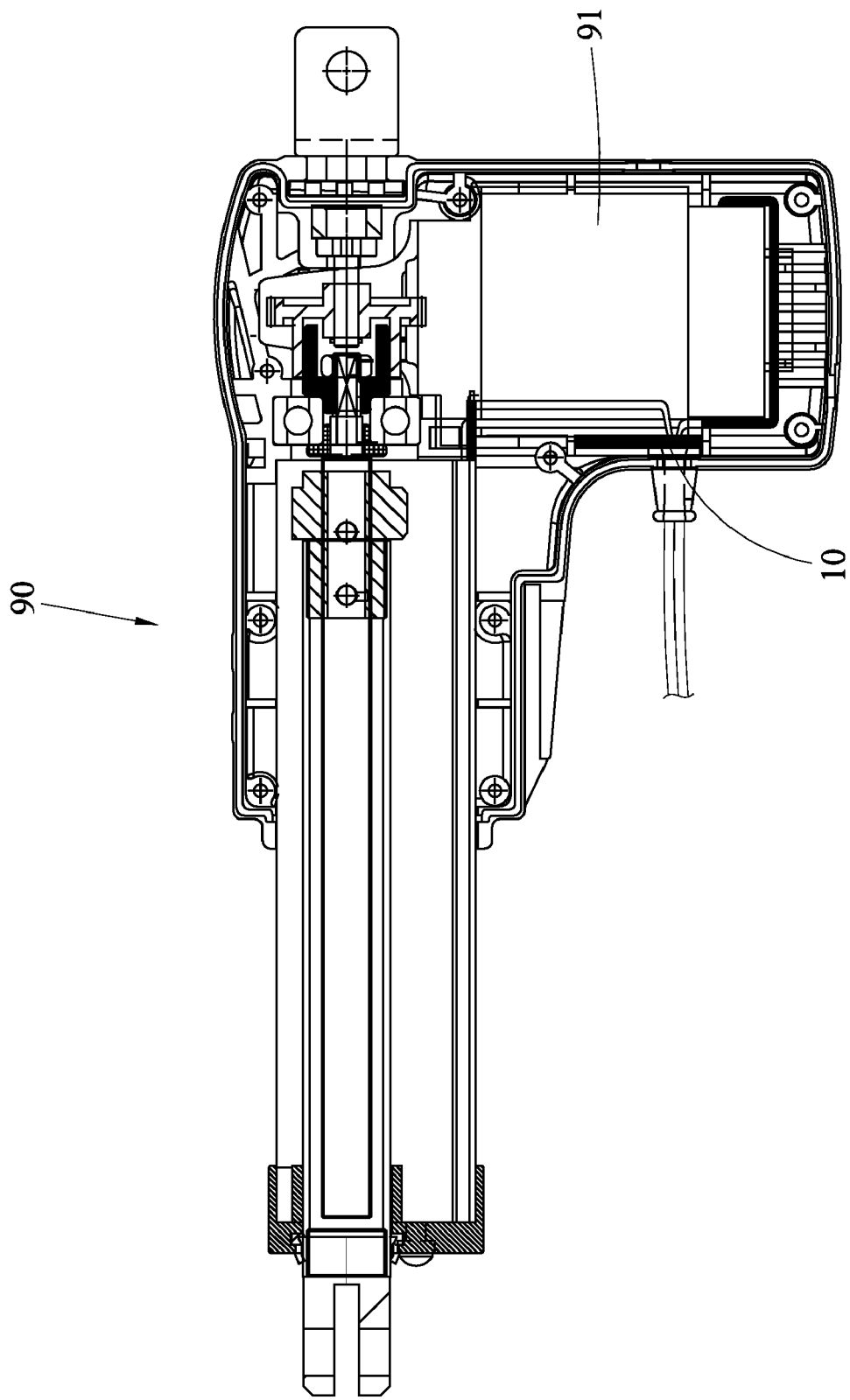
FIG. 4 is a sectional view of a first embodiment of the control device of the present invention, showing the wire layout thereof.

Please refer to FIG. 4. According to a first preferred embodiment, the control device 10 of the present invention is an integration of a limit switch control circuit and an input voltage detection circuit, which is applicable to an actuator 90. To speak more specifically, the control device 10 is inbuilt inside the actuator 90 in the form of a laminated circuit board to reduce the number of external wires of the actuator 90. It is unnecessary to arrange any additional external control circuit for controlling the limit switch and the detection of the input voltage range. Therefore, the wire layout can be simplified.

Figure 5:
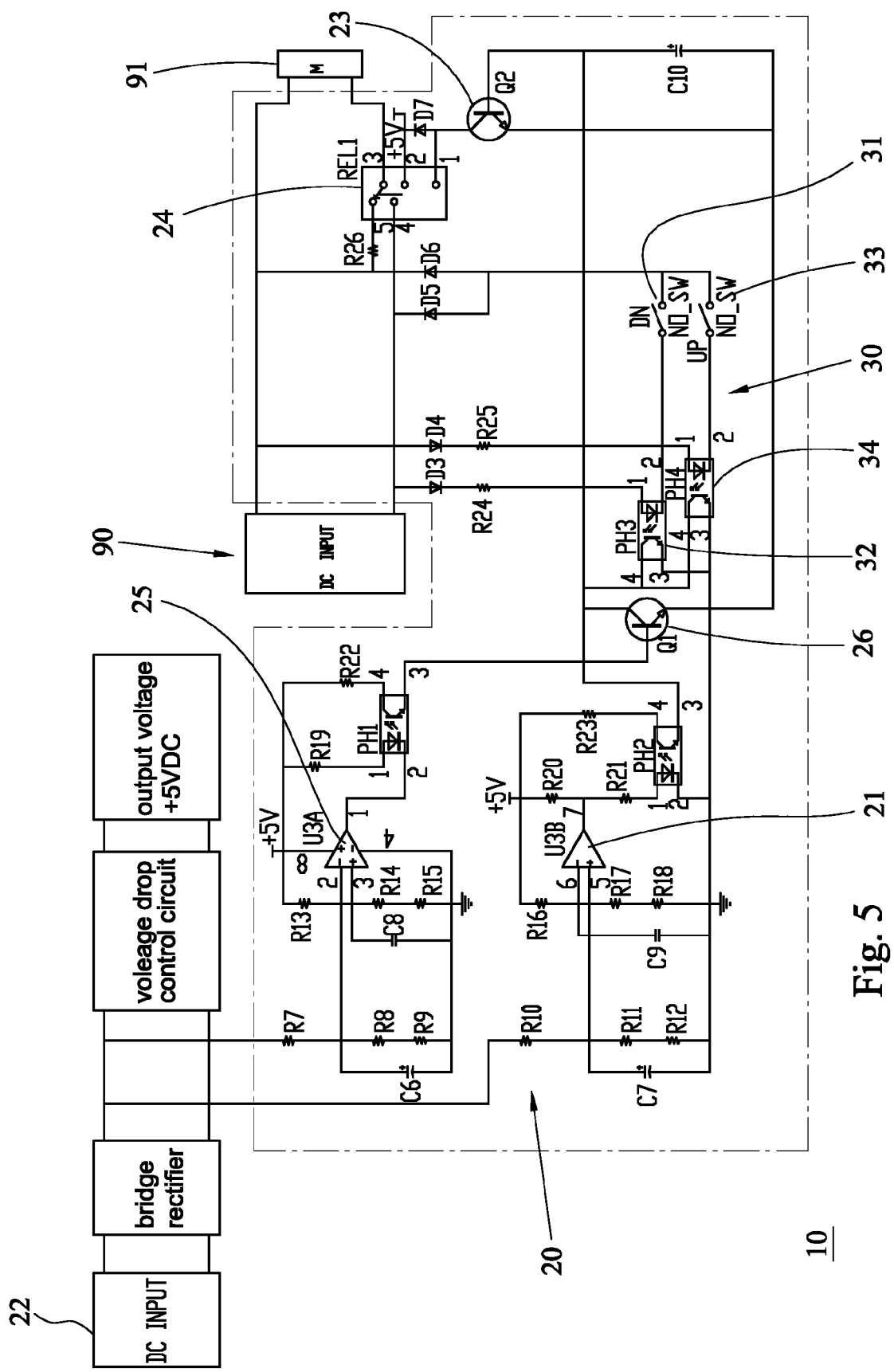
FIG. 5 is a circuit diagram of the normally open limit switches and the voltage detection control circuit of the first embodiment of the control device of the present invention.
Figure 6:
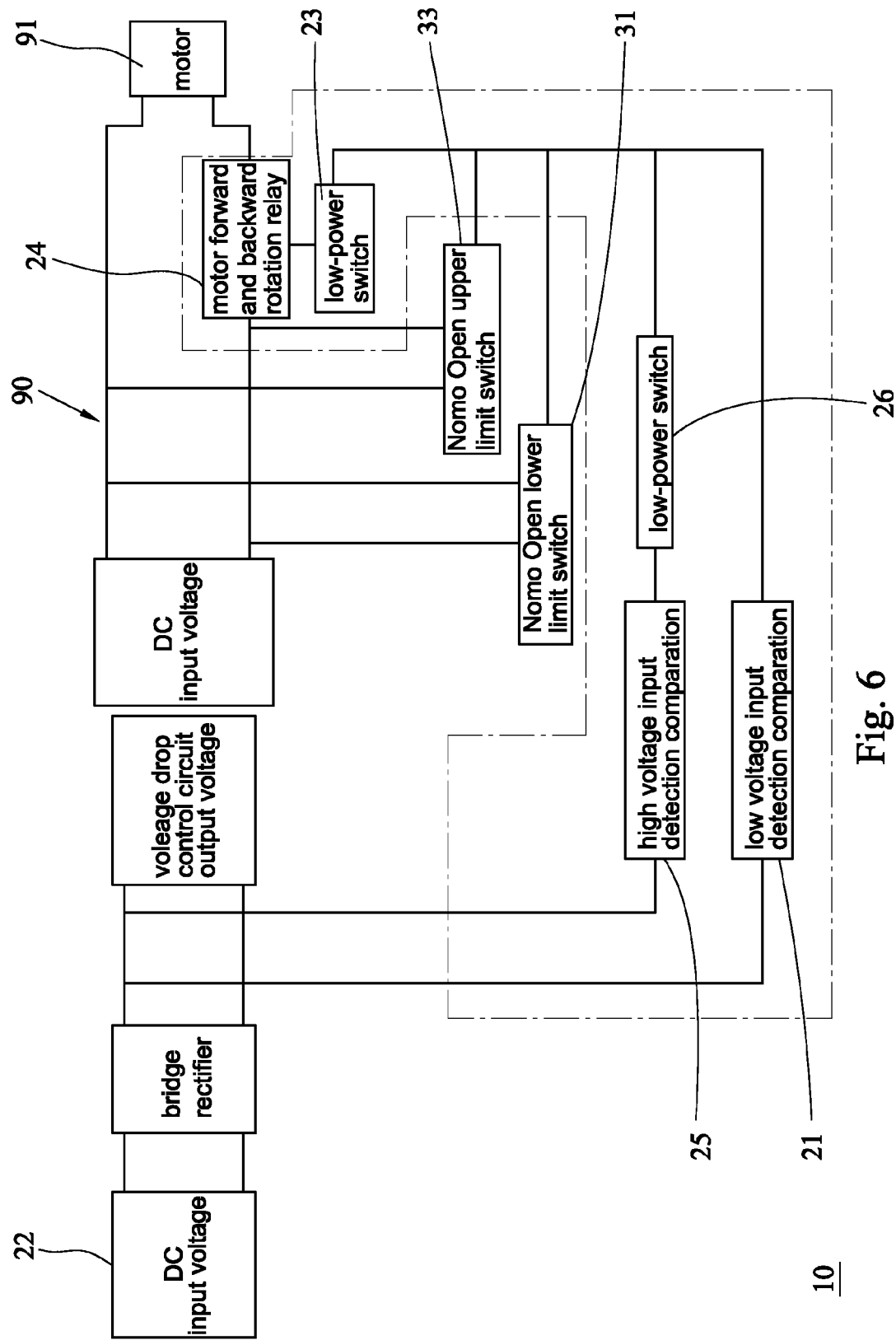
FIG. 6 is a block circuit diagram of the normally open limit switches and the voltage detection control circuit of the first embodiment of the control device of the present invention.

Please now refer to FIGS. 5 and 6. According to the above embodiment, the control device 10 includes a voltage detection unit 20 and a limit switch control unit 30.

The voltage detection unit 20 includes a low voltage input detection comparator 21 connected to a voltage input source 22 for detecting the input DC voltage. A first low-power switch 23 controlled by the low voltage input detection comparator 21 is used to control whether to switch on a relay 24 or not. In the case the low voltage input detection comparator 21 detects that the input DC voltage value is higher than a preset low voltage value, the first low-power switch 23 switches on the relay 24. Under such circumstance, the input current drives a motor 91 of the actuator 90. The voltage detection unit 20 further includes a high voltage input detection comparator 25 connected to the voltage input source 22 for detecting the same. A second low-power switch 26 controlled by the high voltage input detection comparator 25 is used to control whether to switch on the first low-power switch 23 or not. In the case the high voltage input detection comparator 25 detects that the DC voltage of the input source 22 is higher than a preset high voltage value, the second low-power switch 26 controls the first low-power switch 23 to switch off the relay 24. Under such circumstance, the motor 91 of the actuator 90 is turned off.

The limit switch control unit 30 includes a normally open lower limit switch 31 connected to a first optical coupler 32 for controlling the same. The first optical coupler 32 is connected to the first low-power switch 23 to control whether to switch on the first low-power switch 23 or not. The limit switch control unit 30 further includes a normally open upper limit switch 33 connected to a second optical coupler 34 for controlling the same. The second optical coupler 34 is connected to the first low-power switch 23 to control whether to switch on the first low-power switch 23 or not.

According to the above arrangement, when the voltage input from the voltage input source 22 is lower than the set value of the low voltage input detection comparator 21, the first low-power switch 23 is not switched on so that the relay 24 will not be turned on. In this case, the motor 91 of the actuator 90 is not powered on and thus unable to operate.

On the other hand, when the voltage input from the voltage input source 22 is higher than the set value of the low voltage input detection comparator 21, the first low-power switch 23 is switched on to turn on the relay 24. In this case, the motor 91 of the actuator 90 is powered on to operate.

When the voltage input from the voltage input source 22 is higher than the set value of the low voltage input detection comparator 21 and the actuating member of the actuator 90 reaches the upper limit switch 33, the upper limit switch 33 is switched on to turn on the second optical coupler 34. At this time, the first low-power switch 23 is switched off to turn off the relay 24. Under such circumstance, the motor 91 of the actuator 90 will stop operating. Also, when the actuating member of the actuator 90 reaches the lower limit switch 31, the first optical coupler 32 is switched on. At this time, the first low-power switch 23 is switched off to turn off the relay 24. Under such circumstance, the motor 91 of the actuator 90 will also stop operating.

When the voltage input from the voltage input source 22 is higher than the set value of the high voltage input detection comparator 25, the second low-power switch 26 is switched on to switch off the first low-power switch 23. At this time, the relay 24 is switched off and the motor 91 of the actuator 90 stops operating.

Figure 7:
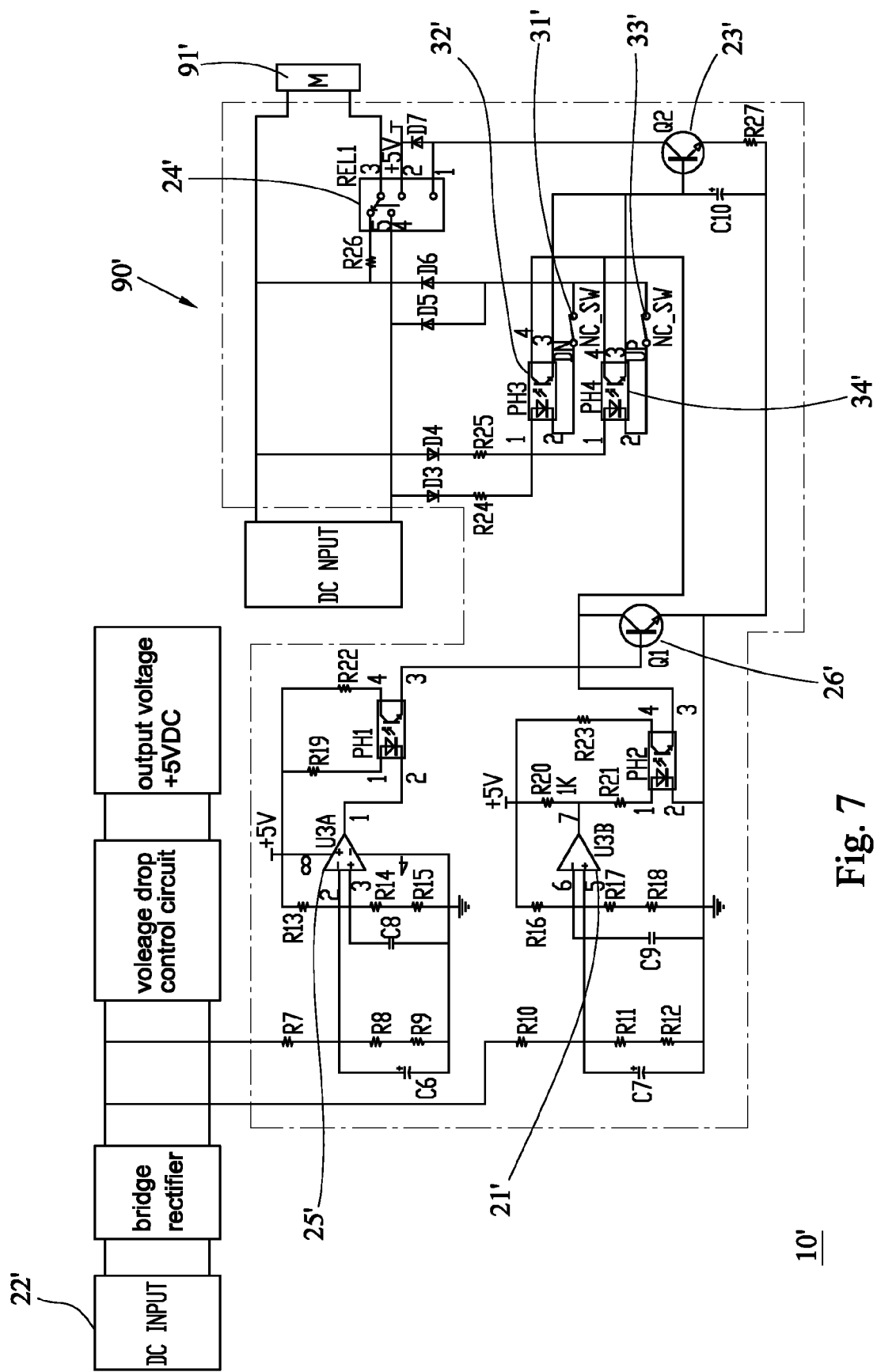
FIG. 7 is a circuit diagram of the normally open limit switches and the voltage detection control circuit of a second embodiment of the control device of the present invention.
Figure 8:
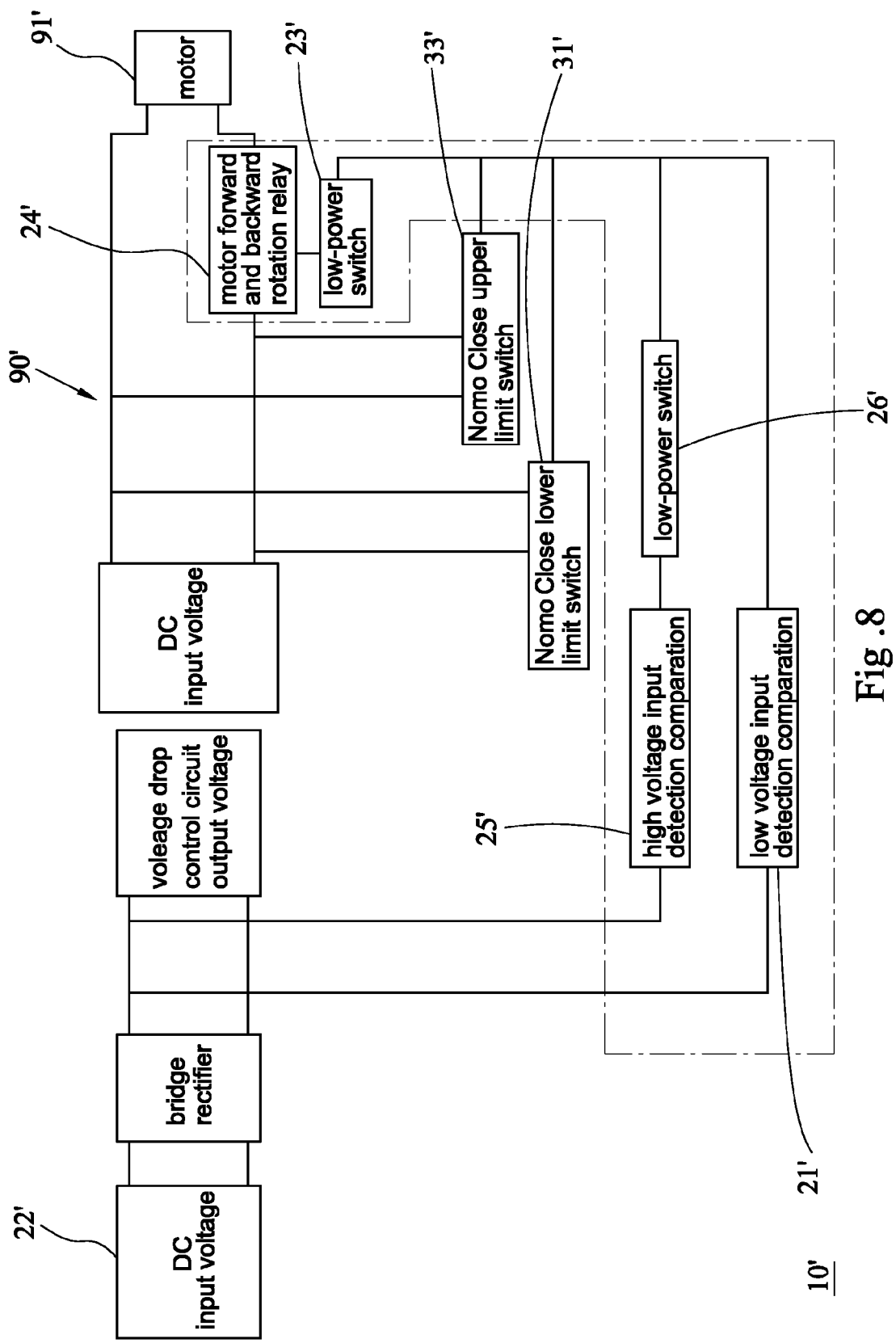
FIG. 8 is a block circuit diagram of the normally open limit switches and the voltage detection control circuit of the second embodiment of the control device of the present invention.

FIGS. 7 and 8 show a second embodiment of the control device 10' of the present invention. The second embodiment is substantially identical to the first embodiment. The second embodiment is only different from the first embodiment in that the lower limit switch 31' and upper limit switch 33' of the second embodiment are normally short-circuited. Accordingly, the second embodiment operates in a different manner as follows:

When the voltage input from the voltage input source 22' is lower than the set value of the low voltage input detection comparator 21', the first low-power switch 23' is not switched on so that the relay 24 will not be turned on. In this case, the motor 91' of the actuator 90' is not powered on and thus unable to operate.

On the other hand, when the voltage input from the voltage input source 22' is higher than the set value of the low voltage input detection comparator 21', the first low-power switch 23' is switched on to turn on the relay 24'. In this case, the motor 91' of the actuator 90' is powered on to operate.

When the voltage input from the voltage input source 22' is higher than the set value of the low voltage input detection comparator 21' and the actuating member of the actuator 90' reaches the upper limit switch 33', the upper limit switch 33' is switched off to turn off the second optical coupler 34'. At this time, the first low-power switch 23' is switched off to turn off the relay 24'. Under such circumstance, the motor 91' of the actuator 90' will stop operating. Also, when the actuating member of the actuator 90' reaches the lower limit switch 31', the first optical coupler 32' is switched off. At this time, the first low-power switch 23' is switched off to turn off the relay 24'. Under such circumstance, the motor 91' of the actuator 90' will also stop operating.

When the voltage input from the voltage input source 22' is higher than the set value of the high voltage input detection comparator 25', the second low-power switch 26' is switched on to switch off the first low-power switch 23'. At this time, the relay 24' is switched off and the motor 91' of the actuator 90' stops operating.

In conclusion, in comparison with the conventional control device, the control device of the present invention has the following advantages:

The control device of the present invention is inbuilt inside the actuator without any additional control circuit for the control of the limit switches and the detection of the input voltage range. Only the positive and negative power cables of the motor are exposed to the exterior of the actuator. The limit switches are used to limit the travel of the actuating member of the actuator so as to avoid collision of the mechanism. The voltage detection unit serves to detect the input voltage range to control the operation of the actuator. Accordingly, the mechanism or the motor is protected from damage due to excessively low or excessively high input voltage. The limit switches are freely adjustable in position and protected from high current. Therefore, the contacts of the limit switches are not liable to damage and the lifetime of the limit switches is prolonged. Moreover, the number of the external connection wires is reduced so that the difficulty in wire keeping is minimized. Also, it is unnecessary to add any external control circuit to the actuator so that the cost is lowered. Moreover, the control device of the present invention has electronic brake function.

The limit switches are freely adjustable in position and protected from high current. Therefore, the contacts of the limit switches are not liable to damage and the lifetime of the limit switches is prolonged.

Moreover, the number of the external connection wires is reduced so that the difficulty in wire keeping is minimized. Also, it is unnecessary to add any external control circuit to the actuator so that the cost is lowered.

The limit switches are used to limit the travel of the actuating member of the actuator so as to avoid collision of the mechanism. Therefore, the lifetime of the mechanism is prolonged.

Moreover, the control device of the present invention has electronic brake function.

The control device of the present invention is also applicable to an actuator with limit switches mounted on outer side.

It is unnecessary to connect the limit switches of the present invention to any external control circuit so that the number of the external connection wires is reduced and the difficulty in wire keeping is minimized.

The voltage detection unit of the present invention serves to detect the input voltage range to control the operation of the actuator.

It is unnecessary to connect the present invention to any external control circuit so that the number of the components is reduced and the cost is lowered.

The above embodiments are only used to illustrate the present invention, not intended to limit the scope thereof. Many modifications of the above embodiments can be made without departing from the spirit of the present invention.

What is claimed is:

1. A control device comprising:

a voltage detection unit including a low voltage input detection comparator connected to a voltage input source for detecting DC voltage input therefrom, the low voltage input detection comparator being further connected to a first low-power switch to determine whether to switch on the first low-power switch or not, the first low-power switch being connected to a relay to control whether to switch on the relay or not so as to control whether to power on or off a motor of an actuator, the voltage detection unit further including a high voltage input detection comparator connected to the voltage input source for detecting the DC voltage input therefrom, the high voltage input detection comparator being further connected to a second low-power switch to determine whether to switch on the second low-power switch or not, the second low-power switch being connected to the first low-power switch to control whether to switch on the first low-power switch or not so as to control whether to switch on the relay or not; and a limit switch control unit including a lower limit switch connected to a first optical coupler for controlling the same, the first optical coupler being connected to the first low-power switch to control whether to switch on the first low-power switch or not, the limit switch control unit further including an upper limit switch connected to a second optical coupler for controlling the same, the second optical coupler being connected to the first low-power switch to control whether to switch on the first low-power switch or not.

2. The control device as claimed in claim 1, wherein the upper and lower limit switches are normally open.

3. The control device as claimed in claim 1, wherein the upper and lower limit switches are normally short-circuited.

* * * * *